United States Patent [19]

Allison, Jr.

[11] 3,941,000

[45] Mar. 2, 1976

[54] EXPANDED SCALE TIMER AND METHOD OF OPERATING SUCH

[75] Inventor: Ralph H. Allison, Jr., Morrison, Ill.

[73] Assignee: General Electric Company, Fort Wayne, Ind.

[22] Filed: Jan. 30, 1975

[21] Appl. No.: 545,338

[52] U.S. Cl. .................. 74/3.5; 58/21.1; 58/21.13; 74/435; 200/38 FA

[51] Int. Cl.$^2$ ........................ G04F 3/02; F16H 5/80

[58] Field of Search ....... 74/3.5, 393, 435; 64/30 R; 58/21.1, 21.13, 21.15, 21.155; 200/38 A, 38 FA

[56] References Cited

UNITED STATES PATENTS

| | | | |
|---|---|---|---|
| 2,620,872 | 12/1952 | Wyman | 58/38 |
| 2,670,794 | 3/1954 | Gallagher | 58/38 |
| 2,864,443 | 12/1958 | Niemand | 58/21.13 |
| 2,917,939 | 12/1959 | Harris | 74/435 |
| 3,180,157 | 4/1965 | Harris | 74/3.52 |
| 3,426,608 | 2/1969 | Loughran et al. | 74/435 X |
| 3,431,720 | 3/1969 | Ehner et al. | 58/22.9 |
| 3,548,126 | 12/1970 | Bassett | 200/38 |
| 3,568,429 | 3/1971 | DeLille | 58/21.13 |
| 3,736,799 | 6/1973 | Harris | 74/3.52 |

*Primary Examiner*—Allan D. Hermann
*Attorney, Agent, or Firm*—Joseph E. Papin

[57] ABSTRACT

An expanded scale timer has means adapted to be driven for indicating the operating time of the timer, and a pair of means are conjointly and relatively movable for respectively driving the indicating means at different predetermined speeds. Means is provided for effecting actuation of the driving means conjointly to drive the indicating means through one of the driving means at one of the speeds and for effecting actuation of the other of the driving means relative to the one driving means to also drive the indicating means at another speed with the one driving means being overridden by the indicating means.

31 Claims, 9 Drawing Figures

EXPANDED SCALE TIMER AND METHOD OF OPERATING SUCH

BACKGROUND OF THE INVENTION

This invention relates in general to electrically driven timers and in particular to an expanded scale timer and a method of operating such.

In the past, various and sundry types of expanded scale or dual speed timers have been utilized in laboratories, factories, and homes for controlling the operating time or cycle of devices requiring rather accurate time measurements for relatively short periods of time but also having timing cycles which may extend over relatively longer periods of time. For instance, one of the more prevalent uses for expanded scale timers is in conjunction with various home appliances, such as an oven or the like. Many of the modern day foods may require only a short period of time for cooking, e.g. about five or ten minutes; therefore, it is necessary to accurately time the cooking period for such foods in order to obviate over-cooking or perhaps burning them. Further, at least some of the modern day ovens, such as an induction type cooking unit or mechanical vibration type cooking unit as well known in the art, are operable to prepare or cook foods in a relatively short period of time as compared with a conventional oven; therefore, it is necessary to accurately time the cooking or operating cycle of such modern day ovens over such relatively short period of time in order to prevent over-cooking or perhaps burning of some foods. Quite obviously, it is also desirable to provide a longer cooking cycle or operating time period for both the conventional type oven and the modern day induction and mechanical vibration type ovens. In order to achieve such accurate regulation or timing during relatively short time periods, the timing scale for the past timers has been elongated or expanded for the relatively short time periods, i.e., from zero to five or ten minutes, so that the desired time setting for any particular operating or timing cycle may be more accurately achieved within the elongated or expanded setting ranges for the shorter periods of time. For instance, in a dial having angularly spaced dial settings from 0° to 360°, the expanded time settings for the relatively short time period of five minutes may occupy the first 165° to 180° of the 360° dial settings, and the successive relatively long time period, i.e., from about thirty minutes to several hours, may occupy the following 165° to 180° of the 360° dial settings. Of course, in order to compensate for the above-discussed expanded time scale for the relatively short period of time, the past timers were operated at a relatively high speed during the short time period in the elongate scale and at a lower speed during the long time period.

In some of the past expanded scale timers in order to attain the high and low speed or dual speed operation thereof, separate motive force applying or motor pinions were driven by separate electric motors, and these motor pinions were clutched together by a cam operated shift arm engaging or disengaging between the motor pinions in overriding relation to effect the dual speed operation. Of course, it is believed that a disadvantageous or undesirable feature of this particular type of past expanded scale timer was not only the expense of providing separate motors for operating it but also the complexity of regulating or clutching them to attain the dual speed operation.

In some other types of past expanded scale timers, two sector-shaped gears of different diameters were conjointly driven and had their respective teeth portions off-set with respect to each other thereby to engage successively with two mating pinion gears also of different diameters in order to effect dual speed operation of such past expanded scale timer. One of the disadvantageous features of this type of past expanded scale timer is believed to be the problem of angularly positioning the sector-shaped gears, i.e., accurately spacing the sector-shaped gears from each other in order to achieve successive and uninterrupted meshing of their respective teeth portions with the associated pinion gearing. In an attempt to overcome this disadvantageous feature, the adjacent ends of the sector-shaped gears were overlapped; however, it is believed that in itself created another disadvantageous feature in that each time the timer translated from the low speed to the high speed operation thereof, the gearing could be mismeshed or be in interferring engagement. Even though it may be possible to overcome or properly design around this gearing interferring engagement or disadvantageous feature, it may require the development of special gearing which in itself may disadvantageously add to the complexity as well as the cost of this type of expanded scale timer.

In still another type of past expanded scale timer, a low speed pinion and a high speed pinion were driven by an electric motor, and a time interval gear mounted on the time set shaft was axially movable both manually and automatically into and out of engagement with the low and high speed pinions thereby to effect the low and high speed modes of operation. A latch cam was operative to axially move the set shaft so that the time interval gear was automatically axially moved therewith toward engagement with the high speed pinion. It is believed that at least one of the disadvantageous or undesirable features of this type of past expanded scale timer involved the improbability of properly meshing the teeth of the pinion gears with that of the time interval gear as it was axially moved toward the pinion gears, and of course, it is believed that this attempt at moving the gearing axially to effect meshing thereof may also be accompanied by a back-lash problem which also may have a disadvantageous effect on the gearing as well as the shafts to which such gearing is mounted.

In yet another of the past expanded scale timers, a segmented time interval gear was rotatable in driven relation between a low speed pinion and a high speed pinion to effect the dual operating modes of the timer. While this type of past expanded scale timer may have been desirable as compared with others of the past timers, it is believed that there was present the problem of a driving gap between the disengagement of the time interval gear from the low speed pinion and the engagement of the time interval gear with the high speed pinion which may be viewed in some respects as a disadvantageous or undesirable feature. Further, it is believed that the transition between the low and high speed modes of operation may also have resulted in a back-lash problem which, of course, may also be disadvantageous.

Many other types of past expanded scale timers too numerous to discuss in detail utilized driving pawls, ratchet arrangements, stop pins, cam drivers as well as many other arrangements to effect dual speed operation but each is believed to be accompanied by various disadvantageous or undesirable features attendent to such arrangements.

SUMMARY OF THE INVENTION

Among the several objects of the present invention may be noted the provisions of a novel expanded scale timer and a novel method of operating such which overcome the disadvantageous or undesirable features discussed hereinabove, as well as others, with respect to the prior art; the provision of such expanded scale timer and such operating method wherein a relatively smooth and uninterrupted transition is effected between the low speed and high speed operating modes of such timer; the provision of such expanded scale timer and such operating methods having a clutching arrangement for effecting a generally uninterrupted drive of such timer during the translation from the low speed operating mode to the high speed operating mode thereof; the provision of such expanded scale timer and such operating method wherein a force of the driving engagement between components of such timer in the low speed operating mode thereof is utilized for effecting an overriding relation between the components of such timer for the high speed operating mode thereof; the provision of such expanded scale timer and such operating method in which means is provided to compensate for displacement of at least the components for effecting the low speed operating modes of the timer in the event any interferring driving engagement therebetween; and the provision of such expanded scale timer which is simplistic in design, economical to manufacture, and easily assembled. Other objects and advantageous features of the present invention will be in part apparent and in part pointed out hereinafter.

In general, an expanded scale timer in one form of the invention has means adapted to be driven for indicating the operating time of the timer, and a pair of means are conjointly and relatively movable for respectively driving the indicating means at different predetermined speeds. Means is provided for effecting actuation of the driving means conjointly to drive the indicating means through one of the driving means at one of the speeds and for effecting actuation of the other of the driving means relative to the one driving means to also drive the indicating means at another speed with the one driving means being overridden by the indicating means.

Also in general and in one form of the invention, an expanded scale timer has means adapted to be driven from an operator selected time set position toward an at-rest position for indicating the remaining operating time of the timer. A pair of means is provided for respectively driving the time indicating means at different predetermined speeds during different predetermined periods of time to return the time indicating means from its selected time set position to its at-rest position. Means is also provided for urging the driving means into clutching engagement, and the urging means is operable generally to slip one of the driving means engaged with the indicating means when the other of the driving means is drivingly engaged with the indicating means to drive it at one speed during one time period and also to effect the clutching engagement of the driving means upon disengagement of the other driving means from the indicating means to drive it through the one driving means at another speed during another of the predetermined time periods.

Further in general, an expanded scale timer in one form of the invention has an electric motor, and a low speed pinion and a high speed pinion is adapted to be displaced toward respective time setting positions. Means is operably displaced generally from an at-rest position in response to an operator applied force thereon for selecting a desired operating time for the timer, and the operating time selecting means includes a cluster gear conjointly displacable therewith. The cluster gear has a continuous gear portion meshed with the high speed pinion and a segment gear portion for meshing engagement with the low speed pinion. Means, such as a clutch spring or the like, is provided for urging the low speed and the high speed pinion into clutching engagement. This clutching engagement initially effects conjoint displacement of the low speed pinion with the high speed pinion through the meshing of the high speed pinion with the continuous gear portion of the cluster gear in response to the operator applied force. The spring or urging means thereafter acts to slip the high speed pinion upon the driving engagement of the segmented gear portion with the low speed pinion to permit further relative displacement of the low speed pinion toward its time setting position. A drive train is interposed between the motor and the low speed pinion, and means, such as an electric switch, is operable generally in response to the displacement of the operating time selecting means for controlling energization of the motor. The motor is energized by the electric switch or controlling means upon the displacement of the operating time selecting means from its at-rest position thereby to actuate the drive train for returning the low speed pinion from its time setting position and for conjointly driving the segmented gear portion therewith until it disengages the low speed pinion while the spring acts to slip the high speed pinion in its meshing engagement with the continuous gear portion of the cluster gear. The spring also acts to effect the clutching engagement of the high speed pinion to the low speed pinion for conjoint return displacement therewith generally at the time of the disengagement of the segmented gear portion of the cluster gear from the low speed pinion. The cluster gear is thereafter driven through the meshing engagement of its continuous gear portion and the high speed pinion to return the operating time selecting means to its at-rest position and thereby de-actuate the controlling means to de-energize the motor.

Also in general and in one form of the invention, a method is provided for operating an expanded scale timer having means operable generally for indicating the remaining operating time of an operator selected time period and a pair of means for driving engagement with the indicating means during the selected time period. In this operating method, one of the driving means is overridden in its engagement with the indicating means, and the other of the driving means is actuated in its driving engagement with the indicating means for a period of time in excess of a predetermined time period which generally constitutes the selected time period. The other driving means is disassociated from its driving engagement with the indicating means at the end of the excess time period, and generally simultaneously therewith, the driving means are conjointly actuated for effecting the driving engagement of the indicating means by the one driving means through the predetermined time period. Still in general, a method in one form of the invention is provided for operating an expanded scale timer having means adapted to be driven for indicating the remaining operating time of the timer and also having a pair of means for driving the time indicating means. This operating method includes the steps of: slipping one of the driving means in overridden relation with the time indicating means; and, actuating the driving means conjointly for effecting the driving of the time indicating means through the one driving means and generally at the same time interrupting the driving association between the other driving means and the time indicating means.

Further in general and in one form of the invention, another method is provided for operating an expanded scale timer having means adapted to be driven for indicating time and also having a pair of means for driving relation with the time indicating means. In this operating method, the following steps are included: overriding one of the driving means in its driving relation with the time indicating means and moving the other of the driving means into driving relation with the time indicating means to effect the driving thereof; and, disassociating the other driving means from its driving relation with the time indicating means and generally simultaneously clutching the driving means together for effecting the driving relation of the time indicating means by the one driving means.

BRIEF DESCRIPTION OF THE DRAWINGS

Corresponding reference characters indicate corresponding parts throughout the several views of the drawings.

The exemplifications of the invention set out herein illustrate preferred embodiments of the invention in one form thereof, and such exemplifications are not to be construed as limiting in any manner.

DETAILED DESCRIPTION OF THE PREFERRED EMBODIMENT

Figure 3:
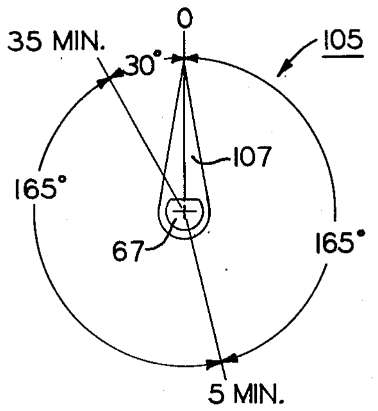
FIG. 3 is a schematic representation of an expanded or elongate time setting scale or dial for the timer of FIG. 1.
Figure 4:
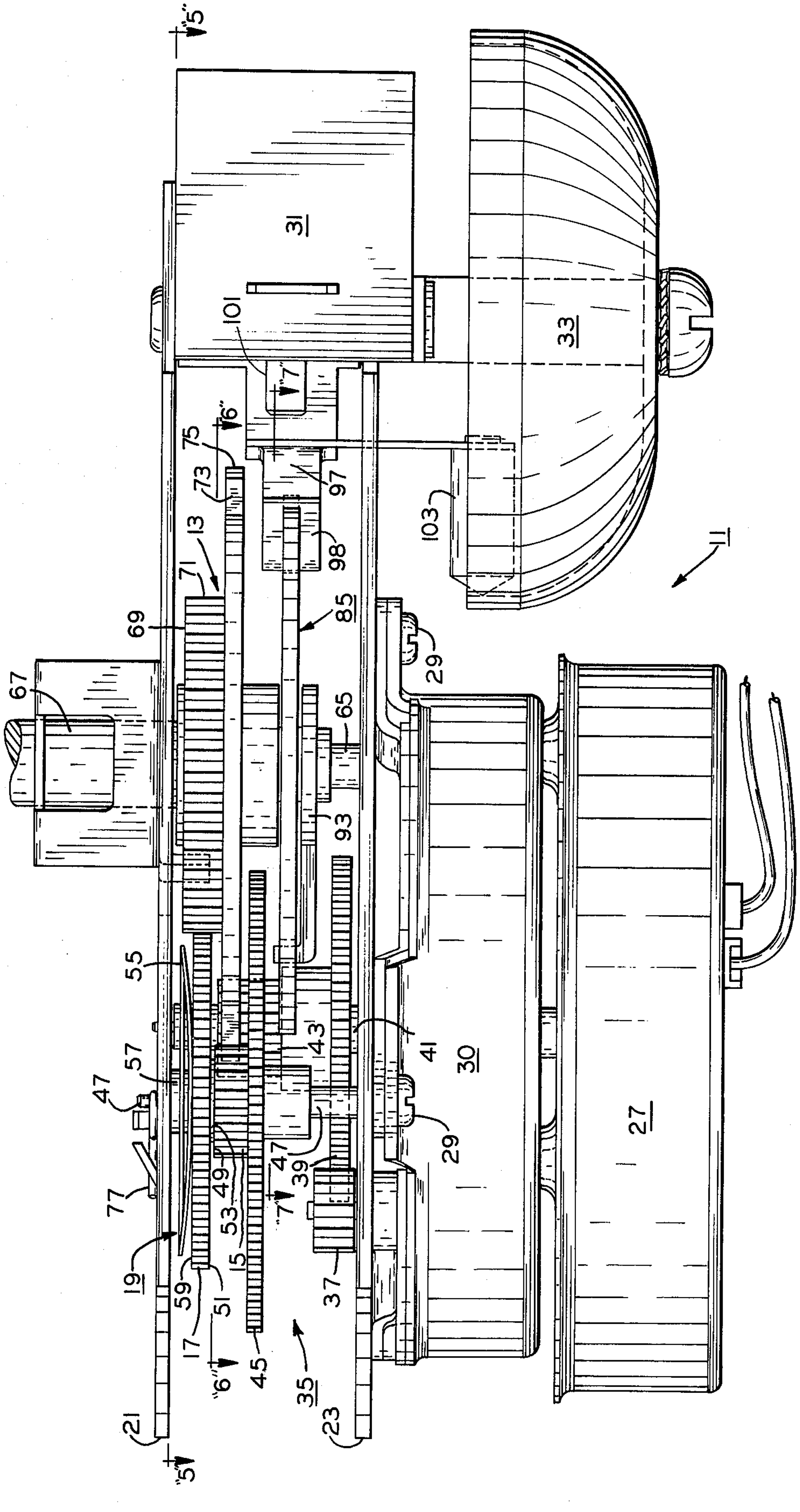
FIG. 4 is a greatly enlarged side elevational view of the timer of FIG. 1 showing the operating mechanism thereof in detail and illustrating principles of a method in one form of the invention of operating the timer.
Figure 5:
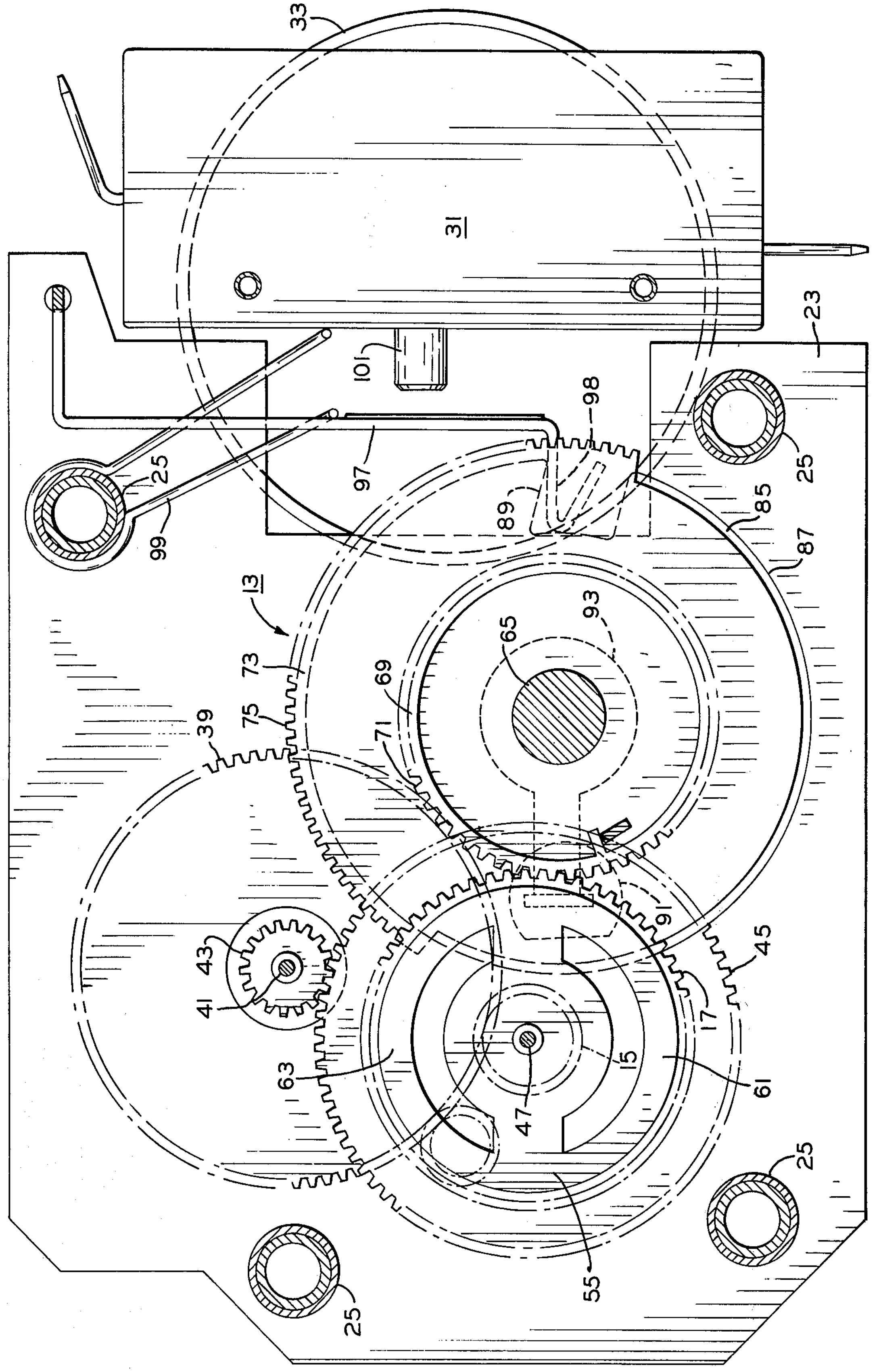
FIG. 5 is a sectional view taken generally along line 5—5 of FIG. 4.
Figure 6:
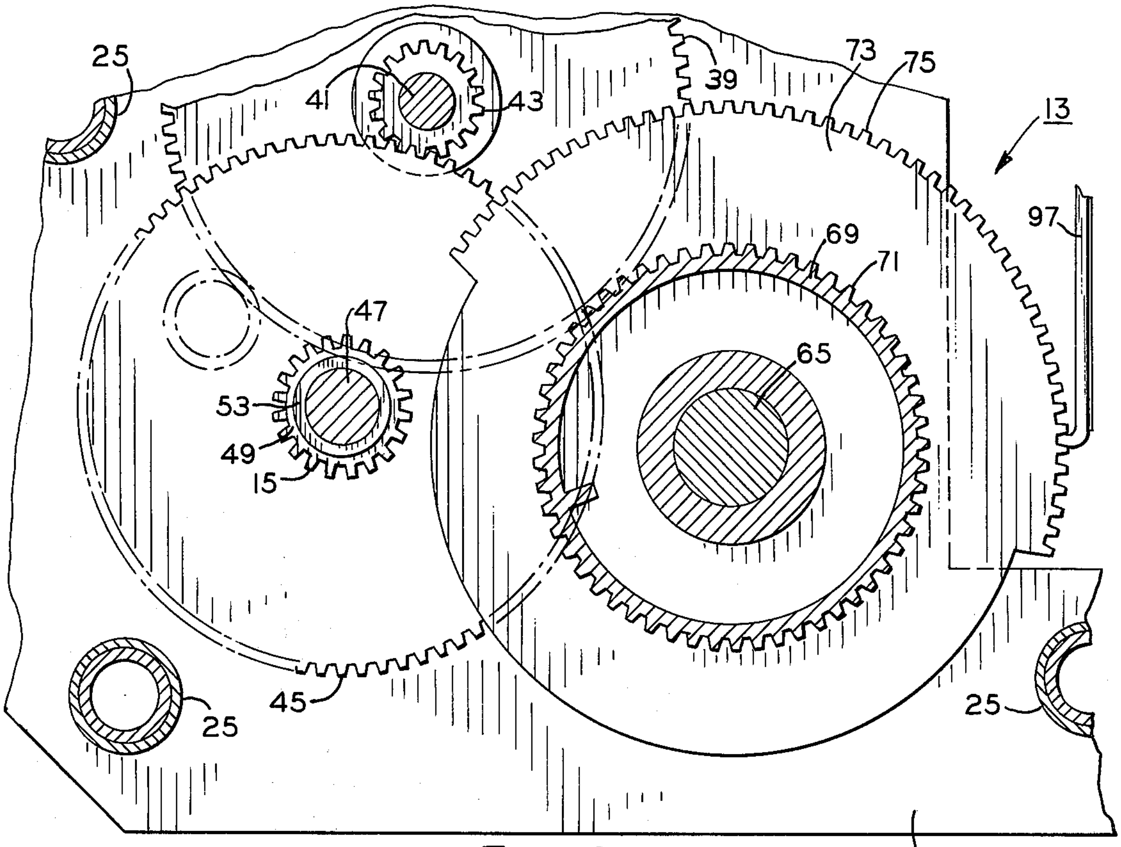
FIGS. 6 and 7 are fragmentary sectional views taken generally along lines 6—6 and 7—7 of FIG. 4, respectively.

Referring now to the drawings in general, there is shown in one form of the invention at 11 an expanded scale or dual speed timer (FIGS. 1–7) having means, such as at least a segmented cluster gear 13 or the like, adapted to be driven for indicating the operating time of the timer (FIGS. 4–6). A pair of means, such as a low speed pinion 15 and a high speed pinion 17, are conjointly and relatively movable for respectively driving indicating means or cluster gear 13 at different predetermined speeds. Means, such as a clutching device indicated generally at 19, is provided for effecting acutation of the driving means or low and high speed pinions 15, 17 conjointly to drive cluster 13 through one of the driving means, such as high speed pinion 17, at one of the speeds and for effecting actuation of the other of the driving means, such as low speed pinion 15, relative to the high speed pinion to also drive the cluster gear at another speed with the high speed pinion being overridden by the cluster gear.

Figure 1:
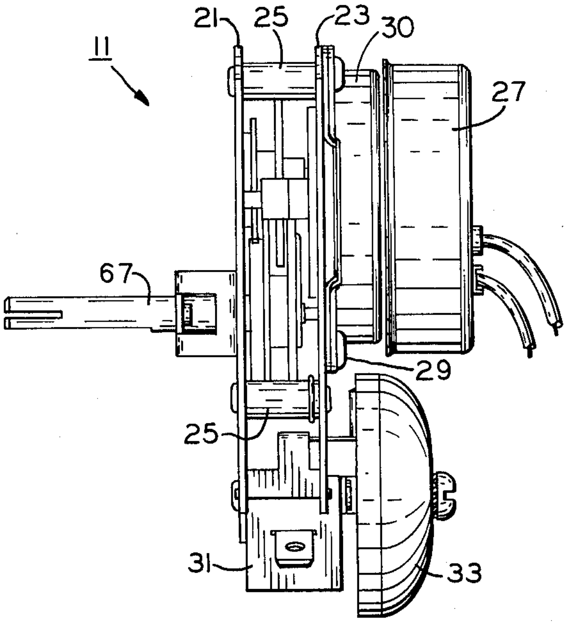
FIG. 1 is a side elevational view of an expanded scale timer in one form of the invention.
Figure 2:
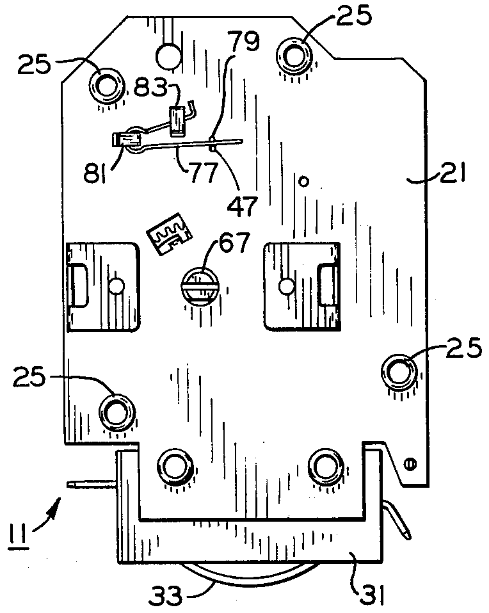
FIG. 2 is a rear elevational view of the time of FIG. 1.

More particularly and with specific reference to FIGS. 1 and 2, timer 11 is provided with a pair of opposite face or mounting plates 21, 23 spaced apart and retained against displacement by a plurality of posts 25 fixedly connected therebetween by suitable means (not shown). Means, such as a small synchronous electric driving motor 27, for applying a motive force to low speed pinion 15 is attached to back mounting plate 23 by suitable means, such as a plurality of screws 29 or the like, and the motor includes a gear reduction housing 30 coupled therewith, as is well known in the art. It is contemplated that motor 29 and its gear reduction housing 30 could, if desired, be enclosed within a unitary housing, as is also well known in the art, within the scope of the invention. Means, such as an electrical switch 31, for controlling the energization and de-energization of the electric motor is also attached by suitable means (not shown) to front mounting plate 21. Means, such as a bell 33 or the like, for sounding an alarm or warning at the termination of the selected operating time period for timer 11, as discussed hereinafter, is mounted to switch 31. While bell 33 is shown for purposes of disclosure, it is contemplated that other alarm or warning devices well known to the art, such as for instance a warning light or buzzer or the like, may be utilized in timer 11 within the scope of the invention. It is also contemplated that means other than motor 27, which is shown for purposes of disclosure, may be utilized to drive timer 11 within the scope of the invention.

Referring now to FIGS. 4–7, a reduction gear train, indicated generally at 35, is interposed between electric motor 27 and low speed pinion 15 for reducing the speed of the motor applied to the low speed pinion. Gear train 35 includes a motor pinion 37 driven by an output shaft (not shown) of motor 27, and the motor pinion is meshed with a first reduction gear 39 mounted for conjoint rotation to a shaft 41 which is journaled or rotatably retained by suitable means (not shown) between front and rear mounting plates 21, 23 of timer 11. A first reduction pinion 43 is also carried by shaft 41 and is drivingly engaged or meshed with a second reduction gear 45 mounted for conjoint rotation to another shaft 47 which is also journaled or rotatably retained by suitable means (not shown) between front and rear mounting plates 21, 23.

Low speed pinion 15 is also mounted to shaft 47 for conjoint rotation therewith being disposed immediately above second reduction gear 45, and high speed pinion 17 is rotatably mounted on the shaft above the low speed pinion so as to be rotatable or movable relative to the low speed pinion as well as conjointly therewith, as discussed in greater detail hereinafter. Low and high speed pinions 15, 17 are respectively provided with adjacent, opposed, and generally planar faces or surfaces 49, 51 for frictional engagement, and means, such as a washer 53, is also mounted on shaft 47 between the adjacent opposite faces of the low and high speed pinions for predetermining the extent of the frictional engagement therebetween. Washer 53 is preferably formed from a polyester material, but it is contemplated that washers of other material having a desired coefficient of friction may be utilized within the scope of the invention. It is contemplated that as an alternative construction adjacent opposed faces 49, 51 of low and high speed pinions 15, 17 could be disposed in direct frictional engagement with each other within the scope of the invention so as to be generally commensurate with the object thereof.

Means, such as a clutch spring 55, for urging high speed pinion 17 toward engagement with washer 53 is mounted on shaft 47, and the clutch spring is interposed between a shoulder 57 on the shaft and another generally planar face or surface 59 on high speed pinion 17 opposite face 51 thereof. Clutch spring 55 is preferably a generally annular wafer type spring, and a pair of radially opposite resilient portions 61, 63 adjacent the periphery of the clutch spring are waved or raised so as to be displaced generally from the generally planar configuration of the clutch spring. In this manner, resilient portions 61, 63 of clutch spring 55 are urged into slipping and gripping or clutching engagement with face 59 of high speed pinion 17 for urging opposite face 51 thereof toward frictional engagement with washer 53; therefore, the clutch spring generally constitutes clutching mechanism 19, as discussed hereinabove. While clutch spring 55 is shown for the purpose of disclosure, it is contemplated that other types of clutch springs having various shapes and component parts, as well known in the art, may also be utilized as a clutching device or mechanism within the scope of the invention.

A main or time setting shaft 65 is journaled or rotatably retained against displacement between front and rear mounting plates 21, 23 by suitable means well known in the art (not shown), and an integral extension 67, as also shown in FIGS. 1 and 3, is provided on the time setting shaft projecting through the front mounting plate exteriorly of timer 11. Cluster gear 13 is mounted to shaft 65 for conjoint rotation therewith, and the cluster gear includes a continuous gear or gear portion 69 having uninterrupted or successive gear teeth 71 about the periphery thereof which mesh with high speed pinion 17. Also included on cluster gear 13 is a segment gear or gear portion 73 having interrupted or segmental gear teeth 75 extending generally about a predetermined portion or segment of the periphery of the segment gear for meshing engagement with low speed pinion 15.

Means, such as a spring 77 shown in FIGS. 2 and 4, is adapted for yielding to compensate for any displacement of low speed pinion 15 relative to cluster gear 13 in the event of any interference therebetween upon the driving or meshing engagement of the low speed pinion with segment gear 73. An elongate aperture 79 is provided in front mounting plate 21 in which an end of shaft 47 is received, and tabs 81, 83 are bent from the front mounting plate to mount spring 77 thereon against displacement and adjacent the elongate aperture for biasing engagement with the shaft. Spring 77 normally urges the end of shaft 47 toward its operating position engaged with front mounting plate 21 at one end of elongate aperture 79; however, in the event of any interferring engagement between low speed pinion 15 on shaft 47 and segment gear 73 upon the meshing engagement thereof, the spring will yield thereby to permit displacement of the shaft in the elongate aperture. This displacement is effective to alleviate any interference which may occur upon the meshing of low speed pinion 15 with segment gear 73 thereby to obviate damage to the respective teeth of the low speed gear and the segment gear. Of course, when proper meshing of low speed pinion 15 and segment gear 73 is re-established, the compressive force of spring 77 acts to return shaft 47 to its normal operating position within elongate aperture 79.

Figure 7:
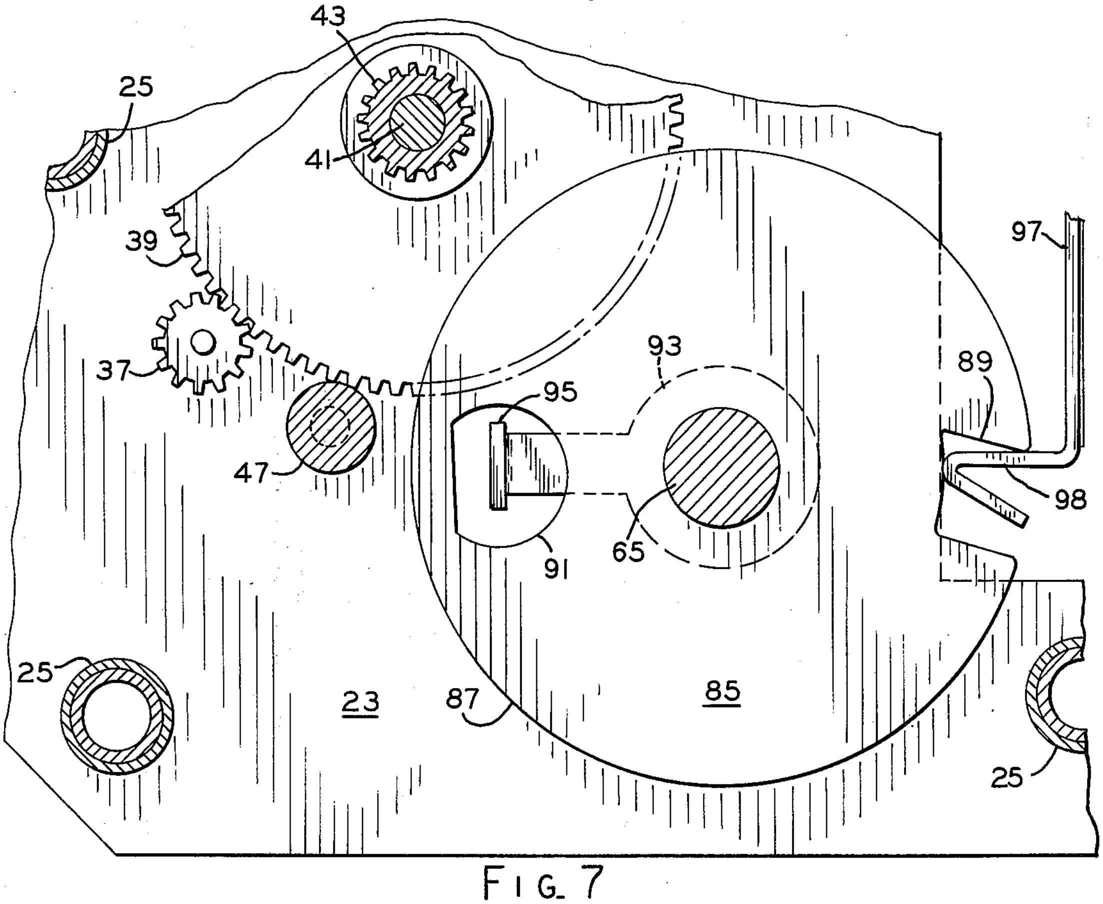

A cam 85, as shown in FIGS. 1, 5 and 7, is rotatably disposed on timer setting shaft 65 adjacent the interior end thereof, and a cam surface 87 having a fall or depression 89 therein is provided on the periphery of the cam. A generally D-shaped aperture 91 is provided through cam 85 adjacent the periphery thereof and generally radially opposite fall 89 in cam surface 87. A cam driver 93 is fixedly received on time setting shaft 65 for conjoint rotation therewith and is disposed immediately below cam 85. Cam driver 93 includes a finger or up-turned flange 95 which extends through aperture 91 in cam 85 for lost motion driving engagement therewith, and in this manner, a predetermined amount of angular or rotatable cam freedom is effected, as further discussed hereinafter. A cam follower 97 having a detent 98 thereon is pivoted between front and rear mounting plates 21, 23, and the detent is urged by a spring 99 acting on the cam follower toward following engagement with cam surface 87 of cam 85. Detent 98 is normally disposed in an at-rest position within fall 89 in cam surface 87. When cam follower 97 is displaced against the compressive force of its spring 99 upon actuation of cam 85, the cam follower actuates a pushbutton or lever 101 of electrical switch 31 thereby to effect energization of electric motor 27, as discussed hereinafter. Switch 31 is also effective to control an appliance (not shown) with which timer 11 is associated. A clapper 103, FIG. 1, is attached to cam follower 97 for ringing bell 33 at the termination of the operating cycle of timer 11, as previously mentioned.

In FIG. 3, there is shown schematically an expanded scale dial 105 which may be mounted to a mechanism or appliance (not shown) with which timer 11 may be utilized, and extension 67 of time setting shaft 65 protrudes through the expanded scale dial generally centrally thereof. The initial or predetermined time period of expanded scale dial 105 is illustrated as five minutes, and this five minute predetermined time period extends angularly from 0° to 165°. The next successive 30 minutes on dial 105 also occupies only 165° thereof extending from 165° to 330°, and the last 30° of the dial is not utilized for timing purposes. While there is shown for purposes of disclosure a predetermined or short time period of five minutes and a longer predetermined time period of thirty minutes on dial 105, it is apparent that other periods or lengths of time may be utilized within the scope of the invention if desired. An operator operable time indicator, such as a setting knob or pointer 107, may be attached to the exterior end of shaft extension 67 by suitable means well known to the art (not shown) for operator actuation to turn the pointer to a desired or selected operating time for timer 11. To conclude the description of timer 11 and its component parts, it may be noted that the aforementioned indicating means may be constituted not only by cluster gear 13 but may also include time setting shaft 65 and pointer 107.

Referring now again to the drawings in general, there is illustrated in one form of the invention a method for operating expanded scale timer 11 having means, such as cluster gear 13, time setting shaft 65 and pointer 107, operable generally for indicating the remaining time of an operator selected time period. Timer 11 also has a pair of means, such as low and high speed pinions 15, 17, for driving engagement with cluster gear 13 during the selected time period. In this operating system, one of the driving means, such as high speed pinion 17, is overridden in its engagement with continuous gear 69 of cluster gear 13, and the other of the driving means, such as low speed pinion 15, is actuated in its driving engagement with segment gear 73 of cluster gear 13 for a period of time in excess of a predetermined time period which generally constitutes the operator selected time period. Low speed pinion 15 is then disassociated from its driven engagement with segment gear 73 at the end of the excess time period, and generally simultaneously therewith, low and high speed pinions 15, 17 are conjointly actuated for effecting the driving engagement of continuous gear 69 of cluster gear 13 by the high speed pinion through the predetermined time period. Other features and advantages of the aforementioned operating system for timer 11 will become apparent or be pointed out in the description of the operating of the timer which follows.

OPERATION

With the component parts of timer 11 in their respective at-rest positions as described above and as shown in the drawings, the timing operation of the timer may be initiated by an operator applying a force on pointer 107 to move it clockwise with respect to expanded scale dial 105 of FIG. 3. Assuming that an operating time is desired or selected in excess of the predetermined time period of five minutes, the operator applied force movement of pointer 107 will move it from its at-rest position at 0° on dial 105 through the predetermined time period, i.e., from 0° to 165° on the dial, to an operator selected time set position within the longer predetermined time period in the last 165° of the dial.

Time setting shaft 65 and cluster gear 13 are conjointly rotated with pointer 107 in response to the operator applied force thereon, and high speed pinion 17 is driven by continuous gear 69 on the cluster gear upon the rotation thereof through the predetermined time period between 0° and 165° on dial 105. The force of the driving or meshing engagement between high speed pinion 17 and continuous gear 69 is sufficient to overcome or override the gripping or frictional engagement between the high speed pinion and washer 53 effected by the compressive force of clutch spring 55. In this manner, clutch spring 55 slips high speed pinion 17 as it is driven by continuous gear 69 to effect rotation of the high speed pinion independently of or relative to low speed pinion 15 which, of course, remains stationary at this time.

When pointer 107 is rotated by the operator to the end of the predetermined time period, i.e., to the five minute mark on dial 105, the conjoint rotation of cluster gear 13 therewith moves segment gear 73 into meshing engagement with low speed pinion 15. Further conjoint rotation of cluster gear 13 with pointer 107 to the operator selected operating time therefor within the longer predetermined time period, i.e., between 165° and 330° on dial 105, also effects concerted rotation of low speed pinion 15 through its meshing engagement with segment gear 73. Of course, gear train 35 is also conjointly driven with low speed pinion 15 through to motor 27. The force of the driving or meshing engagement between low speed pinion 15 and segment gear 73 is, of course, greater than that between high speed pinion 17 and continuous gear 69 and therefore predominates to override the force between the high speed pinion and the continuous gear. As a result of this overriding force established by the meshing engagement of low speed pinion 15 with segment gear 73, clutch spring 55 again acts to slip high speed pinion 17 so that it may be overridden or idly driven by continuous gear 69 of cluster gear 13 when the segment gear thereof is meshed with the low speed pinion.

As pointer 107 is manually moved from its at-rest position by the operator applied force thereon, time set shaft 65 is conjointly movable or rotatable therewith, as previously mentioned, to effect the concerted rotation of cam driver 93. Rotation of cam driver 93 may initially move its flange 95 through the aforementioned lost motion into driving engagement with cam 85 within aperture 91 thereof, and the cam is thereafter conjointly rotatable with time setting shaft 65. As cam 85 is so rotated, cam follower 97 is pivotally driven against the compressive force of its spring 99 and thereby displaced so as to move detent 98 from its at-rest position within cam fall 89 into following engagement with camming surface 87 of the cam, and of course, bell clapper 103 is concertedly movable with the cam follower. This displacement movement of cam follower 97 drivingly engages the cam follower with push button 101 of electrical switch 31 thereby to conjointly move the push button rightwardly (as seen in FIG. 5) to a position effecting actuation of the electrical switch. Of course, the actuation of switch 31 effects energization of electric motor 29, as previously mentioned, for drivingly returning the component parts of timer 11 from their selected operating time positions into which they were moved by the operator to initiate the timing function of the timer, as previously described. In some circuits for appliances (not shown), a latching relay may be provided which may be energized by a push-to-start button for initiating the timing cycle, as is well known to the art, and it is contemplated that such a latching relay scheme may be utilized with timer 11 within the scope of this invention.

Upon the energization of motor 27, its output shaft (not shown) drives motor pinion 37 and thereby also drive train 35 to initiate the return drive of low speed pinion 15. As previously mentioned, the force of the meshing engagement between low speed pinion 15 and segment gear 73 of cluster gear 13 is greater than that between high speed pinion 17 and continuous gear 69 thereby to override it. As a result, clutch spring 55 acts to slip high speed pinion 17 on washer 53, as previously described, so that the high speed pinion is overridden by continuous gear 69 of cluster gear 13 while low speed pinion 15 is drivingly engaged with segment gear 73. It may be noted that the slipping of high speed pinion 17 by clutch spring 55 permits the overriding or driving rotation or movement of low speed pinion 15 generally independently of or relative to the high speed pinion. When pointer 107 is driven or returned from its selected operating time position to the five minute mark on dial 105 in response to the driving engagement of low speed pinion 15 with segment gear 73 of cluster gear 13, teeth 75 of segment gear disengage those of the low speed pinion. At this time, it may be noted that segment gear 73 is disassociated from low speed pinion 15 thereby to eliminate the aforementioned overriding force of the driving engagement therebetween.

Upon the elimination of the overriding force, high speed pinion 17 then begins its driving engagement with continuous gear 69 of cluster gear 13 since the aforementioned force of the meshing or driving engagement therebetween again predominates. It may be noted that the driving engagement of high speed pinion 17 with continuous gear 69 is initiated generally simultaneously with the elimination of the overriding force of the driving engagement between low speed pinion 15 and segment gear 73. Due to the shifting or clutching action of clutch spring 55, it may also be noted that the transition of the driving force from low speed pinion 15 to high speed pinion 17 is not only generally simultaneous or instantaneous but also generally smooth. Clutch spring 55 is operative in response to the force of the driving engagement of high speed pinion 17 with continuous gear 69 for urging face 51 of the high speed pinion toward frictional engagement with face 49 of low speed pinion 15 with friction washer 53 interposed therebetween in frictional or gripping engagement with both faces 49, 51. In this manner, low and high speed pinions 15, 17 are shifted or clutched together for conjoint rotation wherein the motive force of motor 29 is transmitted through drive train 35 and the low speed pinion directly to the high speed pinion. Of course, high speed pinion 17 is responsive to its conjoint or clutch spring actuation with low speed pinion 15 to drive continuous gear 69 at a rate of speed predeterminately greater than that effected during the driving engagement of the low speed pinion with segment gear 73. As a result of being rotated at this higher speed rate, pointer 107 is driven by cluster gear 13 and time setting shaft 65 through the predetermined time period, i.e., returned from the five minute mark to zero on dial 105 of FIG. 3 at such higher speed rate which, of course, compensates for the expanded scale of the dial between the five minute and zero time marks.

As previously noted, cam 85 is conjointly driven by time setting shaft 65 through cam driver 93. Therefore, as pointer 107 is driven back or returned toward its at-rest position by the driving engagement between high speed pinion 17 and continuous gear 69 of cluster gear 13, fall 89 in cam surface 87 of cam 85 is also returning toward its at-rest position beneath detent 98 of cam follower 97. When pointer 107 attains its at-rest position, i.e., 0° on dial 105, cam 85 will be rotated a few degrees in the counterclockwise direction by the engagement of detent 98 with cam surface 87 generally at cam fall 89 in response to the compressive force of cam follower spring 99, and the amount of such counterclockwise rotation is determined by the lost motion between cam driver flange 95 and cam 85 in aperture 91 thereof, as previously mentioned. As a result of the aforementioned counterclockwise rotation of cam 85, the compressive force of cam follower spring 99 urges cam follower 97 with snap-action back into its at-rest position so as to dispose the detent within cam fall 89. Since clapper 103 is conjointly movable with cam follower 97, the snap-action return movement thereof causes the clapper to strike bell 39 sounding an alarm to indicate that the operator selected operating time period has terminated. At the same time, push button 101 of electrical switch 31 is also released or disengaged by the return movement of cam follower 97 thereby to deactuate the switch. Of course, this deactuation of switch 31 effects the de-energization of electric motor 29 thereby to terminate the motive or drive force thereof. In this manner, the return of the component parts of timer 11 from their respective operator selected operating time positions to their at-rest position, as described above, effects the de-energization of motor 29, and the component parts of the timer are again poised for a subsequent timing cycle upon the initiation thereof by the operator.

Figure 8:
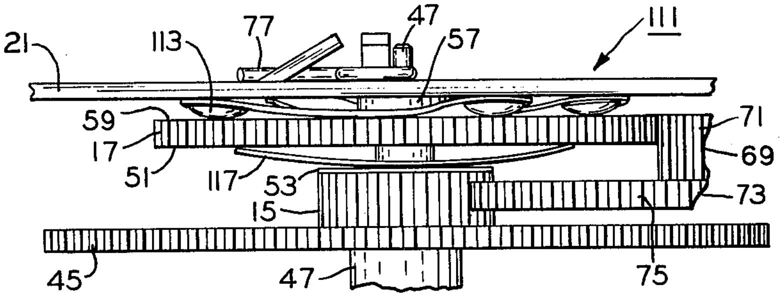
FIGS. 8 and 9 are fragmentary views respectively illustrating alternative clutching arrangements for the timer of FIG. 1.
Figure 9:
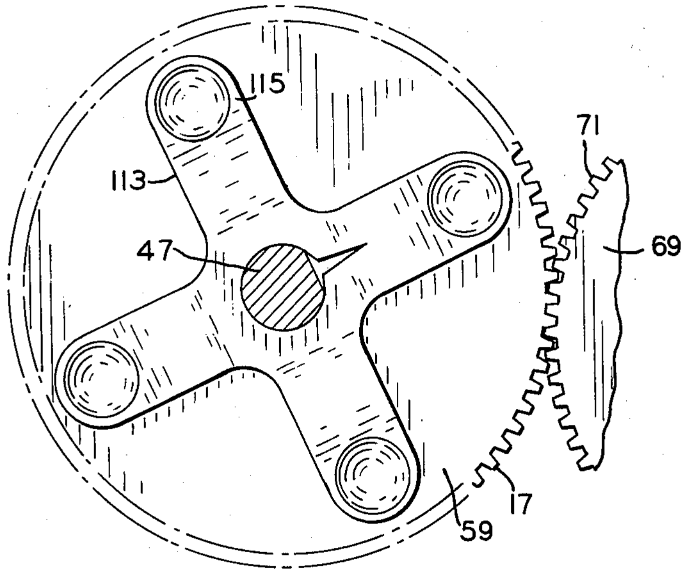

Referring now to FIGS. 8 and 9, an alternative clutching device or arrangement, indicated generally at 111, is shown for low and high speed pinions 15, 17. In clutching devices 111, a clutch spring 113 generally of the wafer type is disposed on shaft 47 and retained between face 59 of high speed pinion 17 and shoulder 57 of the shaft. A plurality of star-like points 115 are integrally provided on clutch spring 113 adjacent the periphery thereof, and these star-like points are bent or displaced away from the generally planar body of the clutch spring so that such star-like points may be biased into slipping and gripping or resilient clutching engagement with front mounting plate 21. A generally annular bevel-shaped or cup-shaped clutch spring 117 is also carried on shaft 47 and is resiliently engaged or biased between washer 53 and face 51 of high speed pinion 17. The clutching or shifting of low and high speed pinions 15, 17 for effecting the generally conjoint and relative movements or rotations thereof in the operation of timer 11, as previously described, is effected or performed by clutch springs 113, 117.

In view of the foregoing, it is now apparent that a novel expanded scale timer 11 and a novel method of operating an expanded scale timer are provided by way of illustration meeting all of the objects and advantageous features set forth hereinabove, as well as others, and that changes in the particular arrangement, shapes and details of the components of the timer, as well as variances in practicing the steps of the operating method, may be made by those having ordinary skill in the art without departing from the spirit of the invention or the scope thereof as set out in the claims which follow.

What I claim as new and desire to secure by Letters Patent of the United States is:

1. An expanded scale timer comprising means adapted to be driven for indicating the operating time of the timer, a pair of means conjointly and relatively movable for respectively driving the indicating means at different predetermined speeds, and means for effecting actuation of the driving means conjointly to drive the indicating means through one of the driving means at one of the speeds and for effecting actuation of the other of the driving means relative to the one driving means to also drive the indicating means at another speed with the one driving means being overridden by the indicating means.

2. An expanded scale timer as set forth in claim 1, wherein the actuation effecting means comprises means for slipping the one driving means so that it may be overridden by the indicating means when the other driving means is driving the indicating means.

3. An expanded scale timer as set forth in claim 1, wherein the actuation effecting means comprises means for clutching the driving means together to effect the conjoint movement thereof when the one driving means is driving the indicating means.

4. An expanded scale timer as set forth in claim 1, wherein the driving of the indicating means by the other driving means establishes a force therebetween in excess of that between the one driving means and the indicating means thereby to effect the overriding relation of the one driving means with the indicating means.

5. An expanded scale timer as set forth in claim 1, further comprising means for urging the driving means toward frictional engagement to effect the conjoint movement thereof, the frictional engagement being overcome when the other driving means is driving the indicating means.

6. An expanded scale timer as set forth in claim 5, wherein the urging means is a spring.

7. An expanded scale timer as set forth in claim 5, wherein the driving means respectively include adjacent opposite faces, the urging means acting on one of the one and other driving means to urge the faces toward the frictional engagement.

8. An expanded scale timer as set forth in claim 5, further comprising means interposed between the driving means to predetermine the extent of the frictional engagement therebetween.

9. An expanded scale timer as set forth in claim 1, wherein the indicating means comprises a cluster gear having a continuous gear portion and a segment gear portion for respective engagement with the one driving means and the other driving means.

10. An expanded scale timer as set forth in claim 9, wherein the engagement of the segment gear portion with the other driving means establishes a force therebetween great enough to effect the over riding relation between the continuous gear portion and the one driving means.

11. An expanded scale timer as set forth in claim 9, wherein the driving relation of the one driving means with the indicating means defines a predetermined portion of the operating time and the driving relation of the other driving means with the indicating means defines another portion of the operating time in excess of the predetermined portion thereof.

12. An expanded scale timer as set forth in claim 11, wherein the other portion of the operating time in its entirety is predeterminately greater than the predetermined portion thereof.

13. An expanded scale timer as set forth in claim 1, wherein the one speed is predeterminately greater than the other speed.

14. An expanded scale timer as set forth in claim 1, further comprising means adapted to yield in the event of any interference between the other driving means and the indicating means thereby to ensure the driving actuation thereof.

15. An expanded scale timer comprising means adapted to be driven from an operator selected time set position toward an at-rest position for indicating the remaining operating time of the timer, a pair of means for respectively driving the time indicating means at different predetermined speeds during different predetermined periods of time to return the time indicating means from its selected time set position to its at-rest position, and means for urging the driving means into clutching engagement, the urging means being operable generally to slip one of the driving means engaged with the indicating means when the other of the driving means is drivingly engaged with the indicating means to drive it at one speed during one time period and also to effect the clutching engagement of the driving means upon disengagement of the other driving means from the indicating means to drive it through the one driving means at another speed during another of the predetermined time periods.

16. An expanded scale timer as set forth in claim 15, further comprising an electric motor connected with the other driving means for effecting the drive thereof.

17. An expanded scale timer as set forth in claim 16, further comprising a reduction gear train operably interposed between the electric motor and the other driving means.

18. An expanded scale timer as set forth in claim 16, further comprising means for controlling energization and deenergization of the electric motor, the controlling means being operable generally to effect the energization of the electric motor in response to operator movement of the indicating means toward the selected time position thereof and to de-energize the electric motor upon the driven return of the indicating means to its at-rest position by the driving means.

19. An expanded scale timer as set forth in claim 15, wherein the urging means comprises a clutch spring engaged with the one driving means for biasing it toward the clutching engagement with the other driving means.

20. An expanded scale timer as set forth in claim 15, wherein the indicating means comprises a cluster gear having a continuous gear portion connected for conjoint movement with a segmented gear portion, the one driving means being continuously engaged with the continuous gear portion and slipped with respect to the other driving means upon the driving engagement thereof with the segmented gear portion.

21. An expanded scale timer as set forth in claim 15, further comprising means for yielding to compensate for displacement of the other driving means relative to the indicating means in the event of any interference therebetween upon the driving engagement of the other driving means with the indicating means.

22. An expanded scale timer as set forth in claim 15, further comprising means for sounding an alarm, and means for displacing the alarm sounding means and effecting snap-action return thereof to sound the alarm in response to the operator movement of the indicating means toward the selected time position thereof and the driven return of the indicating means to its at-rest position by the driving means, respectively.

23. An expanded scale timer comprising an electric motor, a low speed pinion and a high speed pinion adapted to be displaced toward respective time setting positions, means operably displaced generally from an at-rest position in response to an operator applied force thereon for selecting a desired operating time for the timer, the operating time selecting means including a cluster gear conjointly displacable therewith, the cluster gear having a continuous gear portion meshed with the high speed pinion and a segment gear portion for meshing engagement with the low speed pinion, means for urging the low speed pinion and the high speed pinion into clutching engagement, the clutching engagement initially effecting conjoint displacement of the low speed pinion with the high speed pinion through the meshing of the high speed pinion with the continuous gear portion of the cluster gear in response to the operator applied force and the urging means thereafter acting to slip the high speed pinion upon the driving engagement of the segmented gear portion with the low speed pinion to permit further relative displacement of the low speed pinion toward its time setting position, a drive train between the motor and the low speed pinion, means operable generally in response to the displacement of the operating time selecting means for controlling energization of the motor, the motor being energized by its controlling means upon the displacement of the operating time selecting means from its at-rest position thereby to actuate the drive train for returning the low speed pinion from its time setting position and conjointly driving the segmented gear portion therewith until it disengages the low speed pinion while the urging means acts to slip the high speed pinion in its meshing engagement with the continuous gear portion of the cluster gear, and the urging means acting to effect the clutching engagement of the high speed pinion to the low speed pinion for conjoint return displacement therewith generally at the time of the disengagement of the segmented gear portion from the low speed pinion wherein the cluster gear is thereafter driven through the meshing engagement of its continuous gear portion and the high speed pinion to return the operating time selecting means to its at-rest position and thereby de-actuate the controlling means to de-energize the motor.

24. A method of operating an expanded scale timer having means operable generally for indicating the remaining operating time of an operator selected time period, and a pair of means for driving engagement with the indicating means during the selected time period comprising the steps of:

a. overriding one of the driving means in its engagement with the indicating means and actuating the other of the driving means in its driving engagement with the indicating means for a period of time in excess of a predetermined time period which generally constitutes the selected time period; and b. disassociating the other driving means from its driving engagement with the indicating means at the end of the excess time period and generally simultaneously therewith actuating the driving means conjointly for effecting the driving engagement of the indicating means by the one driving means through the predetermined time period.

25. The method as set forth in claim 24, comprising the preliminary step of moving the indicating means manually from a generally at-rest position to the selected operating time and generally simultaneously therewith actuating the one driving means and the other driving means toward their respective overriding and driving engagements with the indicating means of the overriding and actuating step.

26. The method as set forth in claim 24, wherein the overriding and actuating step comprises slipping the one driving means relative to the other driving means upon the driving engagement thereof with the indicating means and applying a motive force only to the other driving means for driving the indicating means through the excess time period.

27. The method as set forth in claim 24, wherein the indicating means includes a portion for interrupting the driving engagement between the other driving and the indicating means, and wherein the disassociating and actuating step comprises terminating the driving engagement of the other driving means with the indicating means generally at the interrupting portion thereof thereby ending the excess time period and clutching the driving means together to effect the driving engagement of the one driving means with the indicating means through the predetermined time period.

28. The method as set forth in claim 25, comprising the generally simultaneous step of energizing means for applying a motive force to the other driving means in response to the manual movement of the indicating means from its at-rest position to its selected operating time.

29. The method as set forth in claim 24, comprising the preliminary step of associating with the other driving means means for yielding to compensate for displacement of the other driving means which may occur in the event of any interferring driving engagement of the other driving means with the indicating means.

30. A method of operating an expanded scale timer having means adapted to be driven for indicating the remaining operating time of the timer, and a pair of means for driving the time indicating means comprising the steps of:

a. slipping one of the driving means in overridden relation with the time indicating means and actuating the other of the driving means for driving the time indicating means; and b. actuating the driving means conjointly for effecting the driving of the time indicating means through the one driving means and generally at the same time interrupting the driving association between the other driving means and the time indicating means.

31. A method of operating an expanded scale timer having means adapted to be driven for indicating time, and a pair of means for driving relation with the time indicating means comprising the steps of:

a. overriding one of the driving means in its driving relation with the time indicating means and moving the other of the driving means into driving relation with the time indicating means to effect the driving thereof; and b. disassociating the other driving means from its driving relation with the time indicating means and generally simultaneously clutching the driving means together for effecting the driving relation of the time indicating means by the one driving means.

* * * * *